US010029690B2

(12) United States Patent
Roos et al.

(10) Patent No.: US 10,029,690 B2
(45) Date of Patent: Jul. 24, 2018

(54) METHOD AND SYSTEM FOR CONTROL OF TEMPERATURE OF AN EXHAUST AFTERTREATMENT SYSTEM

(71) Applicant: SCANIA CV AB, Södertälje (SE)

(72) Inventors: Fredrik Roos, Segeltorp (SE); Elvedin Ramic, Åkers Styckebruk (SE)

(73) Assignee: SCANIA CV AB, Södertälje (SE)

( * ) Notice: Subject to any disclaimer, the term of this patent is extended or adjusted under 35 U.S.C. 154(b) by 200 days.

(21) Appl. No.: 15/110,074

(22) PCT Filed: Jan. 13, 2015

(86) PCT No.: PCT/SE2015/050018
§ 371 (c)(1),
(2) Date: Jul. 6, 2016

(87) PCT Pub. No.: WO2015/108473
PCT Pub. Date: Jul. 23, 2015

(65) Prior Publication Data
US 2016/0332632 A1  Nov. 17, 2016

(30) Foreign Application Priority Data

Jan. 15, 2014  (SE) ...................................... 1450030

(51) Int. Cl.
*B60W 30/18*  (2012.01)
*B60W 10/198*  (2012.01)
(Continued)

(52) U.S. Cl.
CPC ...... *B60W 30/18136* (2013.01); *B60W 10/06* (2013.01); *B60W 10/11* (2013.01);
(Continued)

(58) Field of Classification Search
CPC ...... F01N 11/005; F01N 2900/10; F01N 9/00; F01N 9/005; B60W 10/06; B60W 10/11;
(Continued)

(56) References Cited

U.S. PATENT DOCUMENTS

| 2008/0010987 A1 | 1/2008 | Benz et al. |
| 2010/0043404 A1* | 2/2010 | Hebbale ................... F01N 9/00 60/286 |

(Continued)

FOREIGN PATENT DOCUMENTS

| WO | 2004108467 A1 | 12/2004 |
| WO | 2010110700 A1 | 9/2010 |

(Continued)

OTHER PUBLICATIONS

International Search Report for PCT/SE2015/050018 dated Apr. 13, 2015.

(Continued)

*Primary Examiner* — Thomas G Black
*Assistant Examiner* — Sze-Hon Kong
(74) *Attorney, Agent, or Firm* — Moore & Van Allen PLLC; W. Kevin Ransom

(57) ABSTRACT

A system for control of temperature for a vehicle exhaust treatment system comprising a first determination unit arranged for determination of a temperature for the exhaust treatment system, and a simulation unit arranged for simulation of a future velocity profile, based on information relating to a road section. A second determination unit arranged for determination, based on a future velocity profile, of whether a simulated active brake process due to an over-speed for the vehicle will occur within the road section. A utilization unit is arranged for utilization, if the at least one temperature for the exhaust treatment system is below a minimum temperature threshold value, and if the simulated (Continued)

active brake process is simulated to occur within the road section, of an engine fitted auxiliary brake, which is fitted in connection with an exhaust stream from an engine in the vehicle, where the utilization is initiated before over-speed occurs.

30 Claims, 5 Drawing Sheets

(51) Int. Cl.
*B60W 50/00* (2006.01)
*B60W 10/06* (2006.01)
*B60W 10/11* (2012.01)
*B60W 10/184* (2012.01)
*B60W 30/14* (2006.01)
*B60W 10/196* (2012.01)
*F01N 9/00* (2006.01)
*F01N 11/00* (2006.01)

(52) U.S. Cl.
CPC ........ *B60W 10/184* (2013.01); *B60W 10/196* (2013.01); *B60W 10/198* (2013.01); *B60W 30/143* (2013.01); *B60W 30/18072* (2013.01); *B60W 50/0097* (2013.01); *F01N 9/00* (2013.01); *F01N 9/005* (2013.01); *F01N 11/005* (2013.01); *B60W 2510/068* (2013.01); *B60W 2510/0614* (2013.01); *B60W 2510/1005* (2013.01); *B60W 2520/10* (2013.01); *B60W 2550/142* (2013.01); *B60W 2550/143* (2013.01); *B60W 2550/146* (2013.01); *B60W 2550/22* (2013.01); *B60W 2550/308* (2013.01); *B60W 2710/0694* (2013.01); *B60W 2710/1005* (2013.01); *B60W 2710/18* (2013.01); *B60W 2720/103* (2013.01); *F01N 2900/10* (2013.01); *Y02T 10/54* (2013.01)

(58) Field of Classification Search
CPC ............. B60W 10/184; B60W 10/196; B60W 10/198; B60W 30/143; B60W 30/18072; B60W 30/18136; B60W 50/0097; B60W 2510/0614; B60W 2510/068; B60W 2510/1005; B60W 2520/10; B60W 2550/142; B60W 2550/143; B60W 2550/146; B60W 2550/22; B60W 2550/308; B60W 2710/0694; B60W 2710/1005; B60W 2710/18; B60W 2720/103; Y02T 10/54
See application file for complete search history.

(56) References Cited

U.S. PATENT DOCUMENTS

| 2012/0059572 | A1* | 3/2012 | Larsson | F02D 41/0055 701/112 |
| 2012/0072062 | A1* | 3/2012 | Ando | B60K 6/365 701/22 |
| 2014/0026545 | A1* | 1/2014 | Mori | F01N 3/2033 60/286 |
| 2015/0240685 | A1* | 8/2015 | Morishima | F01N 13/009 60/274 |

FOREIGN PATENT DOCUMENTS

| WO | 2013007497 A1 | 1/2013 |
| WO | 2013007028 A1 | 5/2013 |
| WO | 2013066242 A1 | 5/2013 |
| WO | 2013077028 A1 | 5/2013 |
| WO | 2014051496 A1 | 4/2014 |

OTHER PUBLICATIONS

Written Opinion of the International Searching Authority for PCT/SE2015/050018 dated Apr. 13, 2015.

* cited by examiner

METHOD AND SYSTEM FOR CONTROL OF TEMPERATURE OF AN EXHAUST AFTERTREATMENT SYSTEM

CROSS REFERENCE TO THE APPLICATION

This application is a national stage application (filed under 35 § U.S.C. 371) of PCT/SE15/050018, filed Jan. 13, 2015 of the same title, which, in turn claims priority to Swedish Application No. 1450030-0, filed Jan. 15, 2014 of the same title; the contents of each of which are hereby incorporated by reference.

FIELD OF THE INVENTION

The present invention relates to methods, systems, and computer program products for control of at least one temperature $T_{exhaust}$ for an exhaust treatment system.

BACKGROUND

The following background description constitutes a description of the background to the present invention, and thus need not necessarily constitute prior art. Engines, such as for example engines comprised in vehicles or ships, are usually equipped with an exhaust purification system which is arranged to purify exhausts from an engine in the vehicle.

There is a number of threshold values for emission levels of particles, substances and/or compounds, which have been established by authorities. Vehicles must comply with these emission levels in order to travel on the roads. Additionally, vehicle owners and/or drivers are also environmentally aware, and keen to avoid emitting more exhausts than necessary when a vehicle is used. It is therefore important that the exhaust treatment system can purify the exhaust stream from the engine efficiently before it is released into the surrounding air.

SUMMARY OF THE INVENTION

The function of certain components in the exhaust treatment system is dependent on its temperature. For example, a reduction catalyst device (such as an SCR-catalyst) reduces the fraction of nitrogen oxides $NO_x$ more efficiently when the SCR-catalyst is warm, than when it is cold.

At cold starts, or in driving modes which cool down the exhaust treatment system, the SCR-catalyst, for example, provides a poor reduction of nitrogen oxides $NO_x$, which entails a risk that the vehicle may not meet the emission standards applicable to the vehicle. There are several driving modes entailing a risk of low temperatures in the exhaust treatment system that negatively impact the exhaust purification. Typically, driving modes with a small or no fuel injection to the engine result in a cooling of the system, since the exhaust flow passing through the exhaust treatment system mainly consists of cold air that cools down the components in the exhaust treatment system.

Dragging of the engine, also called engine braking of the vehicle, when the vehicle is driven forward by its kinetic energy with a closed power-train and without fuel being injected into the engine, is an example of a driving mode, where there is a risk that the components in the exhaust treatment system may be cooled down. Normal braking is another driving mode entailing a risk that the components in the exhaust treatment system may be cooled down, since very little fuel is injected into the engine. Also in the coasting driving mode, when the vehicle is rolling forward with an open power-train, such as with the gearbox in a neutral gear or with an open clutch, very little fuel is injected into the engine, so that there is a risk that the exhaust treatment system may be too cold to efficiently purify the exhaust stream from the engine.

When the vehicle, after a driving mode that cools down the exhaust treatment system, transitions into a driving mode where more fuel is injected into the engine, so that more exhausts are consequently formed, the exhaust treatment system is often too cold to be able to purify these exhausts efficiently.

A city bus may be mentioned as a non-limiting example of a problematic use of vehicles in this regard. A city bus has relatively many starts and stops when driven. Such driving of the bus entails that the bus driver often brakes and/or engine brakes before bus stops, for example, and the exhaust treatment system is then cooled down. After stopping at the bus stop, the bus is accelerated to drive on, and a lot of fuel is then injected in the engine, while the exhaust treatment system is too cold to be able to efficiently handle the exhaust flow resulting from such acceleration.

In prior art solutions, the temperature of the exhaust treatment system has been prevented from dropping too low by actively heating the exhaust treatment system. Such active heating has been achieved by injecting extra fuel at for example idling, so that the extra fuel is burned and creates heat. Accordingly, previously a bus, as an example, would first brake and/or engine brake before a bus stop, and the exhaust treatment system would then be cooled down, and subsequently the exhaust treatment system of the bus would be actively heated by way of extra fuel injection while the bus is idling at the bus stop, following which the bus would accelerate after the bus stop, and the exhaust treatment system, because of the active heating, would have a temperature which is suitable for exhaust purification. These prior art solutions may hence provide acceptable exhaust purification, but at the cost of extra fuel consumption. In other words the prior art exhaust purification is not energy efficient. Energy is created in the vehicle by way of the combustion in the engine, which means non-energy efficient solutions increase fuel consumption.

The extra fuel consumption is costly and also contributes to emissions, for example of carbon dioxide $CO_2$, from the vehicle.

It is therefore one objective of the present invention to provide a method and a system for control of at least one temperature $T_{exhaust}$ for an exhaust treatment system in a vehicle, which at least partly resolves the above mentioned problem.

According to the present invention at least one temperature $T_{exhaust}$ for the exhaust treatment system is determined. A simulation of at least one future velocity profile $v_{sim}$ for an actual vehicle speed $v_{act}$ within a road section ahead of the vehicle is carried out, based on information relating to the road section ahead of the vehicle. Subsequently, it is determined whether a simulated active brake process $brake_{sim}$ will occur within the road section because of an over-speed of the vehicle. The at least one future velocity profile $v_{sim}$ is here used as a basis for the determination of whether or not the simulated active brake process $brake_{sim}$ will occur, which means that any potential use of the simulated active brake process $brake_{sim}$ may be determined with high reliability.

If the at least one temperature $T_{exhaust}$ for the exhaust treatment system is lower than a minimum temperature threshold value $T_{min}$, and if the simulated active brake process $brake_{sim}$ is simulated to occur within the road section, at least one engine fitted auxiliary brake in the vehicle is used. The use of the at least one engine fitted auxiliary brake is initiated, according to the present invention, before the vehicle reaches a position where the over-speed occurs. The at least one engine fitted auxiliary brake is fitted in connection with an exhaust stream from the engine in the vehicle, and may thus impact the temperature of the exhaust stream. As a result, the use of the at least one engine fitted auxiliary brake may, because of heat generated in the exhaust treatment system, increase the temperature of the exhaust stream and hence the at least one temperature $T_{exhaust}$.

The present invention bases the control of the use of the at least one engine fitted auxiliary brake, and hence also the control of the temperature $T_{exhaust}$ for the exhaust treatment system, on the at least one future velocity profile $v_{sim}$. The at least one future velocity profile $v_{sim}$ may today be simulated very accurately, based on reliable and accurate information about the road section ahead. Therefore, it is possible to determine, very accurately, if and when an over-speed may occur within the road section, which means that the method according to the present invention may very reliably and accurately control the at least one engine fitted auxiliary brake, so that the control of the temperature $T_{exhaust}$ for the exhaust treatment system means that an efficient exhaust purification may be provided by the exhaust treatment system.

The use of the at least one engine fitted auxiliary brake thus heats the exhaust stream which, in turn, heats the components in the exhaust treatment system, or at least reduces the cooling of the components in the exhaust treatment system. By activating the at least one engine fitted auxiliary brake already before the active brake process occurs, a longer period of time with the use of the at least one engine fitted auxiliary brake, and accordingly an improved heating of the exhaust treatment system's components, is obtained compared to prior art systems. Accordingly, a more efficient purification of the exhaust stream from the engine, passing through the exhaust treatment system, is achieved. A lower fuel consumption is also obtained as a result.

Overall, with the use of the present invention, lower emissions are obtained from the vehicle since the components in the exhaust treatment system may operate at suitable temperatures, which means that the efficiency of the exhaust treatment system's components increases.

In order to ensure a performance of the exhaust treatment system and to prevent inconsistent control, according to one embodiment the at least one engine fitted auxiliary brake may only be used if this means that the exhaust stream, through such use, obtains a favorable exhaust flow and/or a favorable exhaust stream temperature $T_{exhaust\_stream}$.

In order to ensure safe driving of the vehicle and also to provide a system which is intuitively acceptable, according to one embodiment the control of the at least one temperature $T_{exhaust}$ may only be carried out in such a way, that a provided total braking energy is lower than a simulated requested total braking energy for a driving situation at hand. The total braking energy here comprises the extra braking energy, resulting from the control of the at least one temperature $T_{exhaust}$, since the at least one engine fitted auxiliary brake is used and accordingly adds braking energy.

BRIEF DESCRIPTION OF THE FIGURES

The invention will be illustrated in more detail below, along with the enclosed drawings, where similar references are used for similar parts, and where.

DETAILED DESCRIPTION

Figure 1:
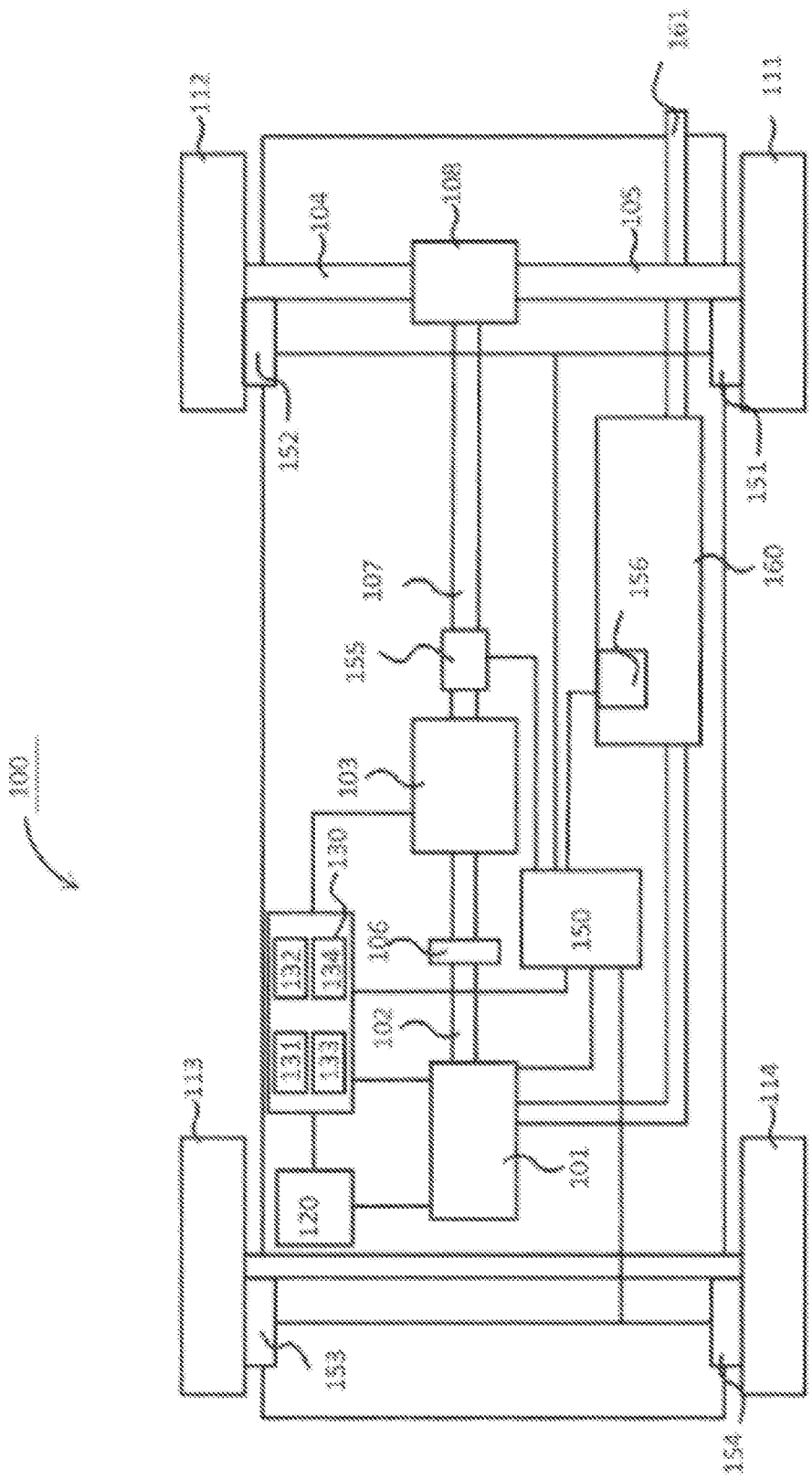
FIG. 1 schematically shows an example vehicle,
FIG. 2 schematically shows an example of an exhaust treatment system.

FIG. 1 schematically shows a vehicle 100 in which the present invention may be implemented. The vehicle 100 comprises a power-train. The power-train comprises a combustion engine 101, which in a customary manner, via an output shaft 102 on the combustion engine 101, usually via a flywheel, is connected to a gearbox 103 via a clutch 106. The gearbox 103 is here illustrated schematically as one unit. However, the gearbox 103 may also physically consist of several cooperating gearboxes, for example a so-called range gearbox, a main gearbox and a split gearbox, which are arranged along the vehicle's power-train.

The vehicle 100 further comprises drive shafts 104, 105, which are connected to the vehicle's driving wheels 111, 112, and which are operated by an output shaft 107 from the gearbox 103, via a shaft gear 108, such as a customary differential shaft. The vehicle 100 also comprises additional wheels 113, 114, which may be driving or non-driving, and may be arranged for control of the vehicle.

The vehicle 100 also comprises various different brake systems 150. The brake systems 150 may comprise a customary service brake system, which may e.g. consist of wheel brakes 151, 152, 153, 154, comprising brake discs and/or brake drums with associated brake pads, or similar, arranged in connection with the vehicle's wheels 111, 112, 113, 114. The brake system 150 may also comprise one or several extra/auxiliary brakes, for example a brake which acts on the vehicle's power-train 155, such as a retarder, an electromagnetic brake, a decompression brake, or an exhaust brake. A retarder may comprise one or several of a primary retarder, placed between the engine and the gearbox, and a secondary retarder, placed after the gearbox. An electromagnetic brake may be placed in any suitable place where it may act on the vehicle's power-train.

A decompression brake may be integrated in the engine. An exhaust brake uses a damper fitted in the exhaust outlet, in order to increase the engine's pump losses and thus its braking torque, to achieve a braking effect. The exhaust brake may be seen as integrated in the engine 101, or at least in the engine 101 and its exhaust treatment system 160. In this document, exhaust brakes and decompression brakes are comprised in the term engine fitted auxiliary brakes 156. Such engine fitted auxiliary brakes 156 are here arranged/fitted in connection with an exhaust stream from the engine 101 and are schematically drawn in the figure, at an exhaust treatment system 160 for the vehicle. However, in the present invention such engine fitted auxiliary brakes 156 may also be arranged substantially anywhere along the passage of the exhaust stream out from the engine 101 to, and through, the exhaust treatment system 160. In other words the engine fitted auxiliary brakes 156 are arranged upstream of the exhaust treatment system 160, at or downstream of the engine, and/or in the exhaust treatment system 160.

The brakes 155 acting on the power-train are here schematically drawn as acting on the gearbox's output shaft 107. However, such brakes 155 may be arranged substantially anywhere along the vehicle's power-train, and may act substantially anywhere a braking effect may be achieved.

The engine 101 may be controlled based on instructions from a cruise control 120, in order to maintain an actual vehicle speed and/or to vary the actual vehicle speed, for example so that an optimized fuel consumption is obtained within reasonable speed limits.

The vehicle 100 also comprises at least one control device 130, arranged to control a range of different functions in the vehicle, such as among others the engine 101, the brake system 150 and the gearbox 103.

As described in further detail below, the control device 130 in the system comprises a first determination unit 131, a simulation unit 132, a second determination unit 133 and a utilisation unit 134.

As a person skilled in the art will realize, the control device may also be installed to control one or several further units in the vehicle, such as for example the clutch 106 and/or the gearbox 103 (not displayed in the figure).

In the figure, the at least one control device 130 is drawn as being separate from the cruise control 120. However, the control device 130 and the cruise control 120 may exchange information with each other. The cruise control 120 and the control device 130 may also be logically separate, but physically implemented in the same unit, or may be logically and physically jointly arranged/implemented.

Figure 2:
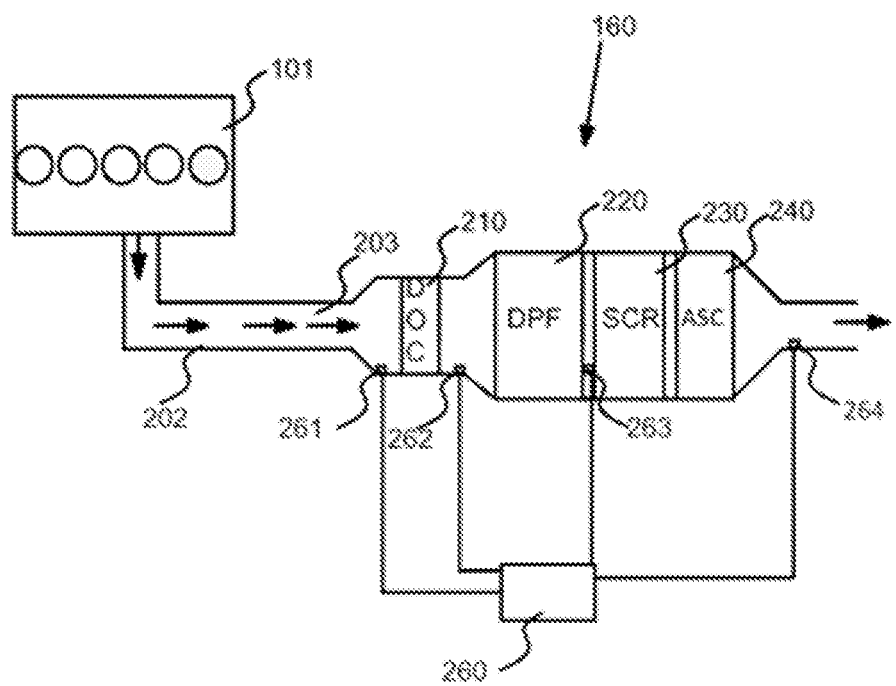

In FIG. 2 an example of components comprised in an exhaust treatment system 160 are displayed. Such exhaust system 160 may for example consist of a so-called EuroVI-system, as illustrated in FIG. 2, but the present invention may be applied to substantially all types of exhaust treatment systems, in which one or several components comprised are impacted by temperature in some way.

In FIG. 2, the exhaust treatment system 160, with an exhaust pipe 202, is schematically connected to a combustion engine 101, wherein the exhausts generated during combustion, that is to say the exhaust stream 203, is indicated with arrows. The exhaust stream 203 is led to a diesel particulate filter (DPF) 220, via a diesel oxidation catalyst (DOC) 210. During the combustion in the combustion engine, soot particles are formed, and the particulate filter 220 is used to catch these soot particles. The exhaust stream 203 is here led through a filter structure, where soot particles are caught from the exhaust stream 203 passing through, and are stored in the particulate filter 220.

The oxidation catalyst DOC 210 has several functions and is normally used primarily to oxidize, at the exhaust purification, remaining hydrocarbons $C_xH_y$ and carbon monoxide CO in the exhaust stream 203 into carbon dioxide $CO_2$ and water $H_2O$. The oxidation catalyst 210 may also oxidize a large fraction of the nitrogen monoxides NO occurring in the exhaust stream into nitrogen dioxide $NO_2$. The oxidation of nitrogen monoxide NO into nitrogen dioxide $NO_2$ is important to the nitrogen dioxide based soot oxidization in the filter, and is also advantageous at a potential subsequent reduction of nitrogen oxides $NO_x$.

For the reduction of nitrogen oxides $NO_x$ the exhaust treatment system 160 also comprises an SCR (Selective Catalytic Reduction) catalyst 230, downstream of the particulate filter DPF 220. SCR catalysts use ammonia $NH_3$, or a composition from which ammonia may be generated/formed, e.g. urea, as an additive for the reduction of nitrogen oxides $NO_x$ in the exhaust stream. The reaction rate of this reduction is impacted, however, by the ratio between nitrogen monoxide NO and nitrogen dioxide $NO_2$ in the exhaust stream, so that the reductive reaction is impacted in a positive direction by the previous oxidation of NO into $NO_2$ in the oxidation catalyst DOC.

As mentioned above, the SCR-catalyst 230 requires additives to reduce the concentration of for example nitrogen oxides $NO_x$ in the exhaust stream 203. Such additive is injected into the exhaust stream upstream of the SCR-catalyst 230 (not displayed in FIG. 2). This additive, as mentioned above, is often nitrogen- and/or urea-based and may consist of e.g. AdBlue, which basically consists of urea diluted with water. Urea forms ammonia at heating (thermolysis) and at heterogeneous catalysis on an oxidizing surface (hydrolysis), which surface may, for example, consist of titanium dioxide TiO2, within the SCR-catalyst. The exhaust treatment system may also comprise a separate hydrolysis catalyst.

The exhaust treatment system 160 may also be equipped with a slip-catalyst ASC 240, which is arranged to oxidize an excess of ammonia that may remain after the SCR-catalyst 230. Accordingly, the slip-catalyst ASC 240 may provide a potential for improving the system's total NOx-conversion/reduction.

The exhaust treatment system 160 may also be equipped with one or several sensors, such as one or several $NO_x$—and/or temperature sensors 261, 262, 263, 264 for the determination of nitrogen oxides and/or temperatures in the exhaust treatment system. The exhaust treatment system also comprises one or several pipe sections 202, through which the exhaust stream is transported between the components inside the exhaust treatment system, on their route from the engine and through the exhaust treatment system 160.

The performance of one or several of the components in the exhaust treatment system 160, that is to say one or several of the DOC-catalyst 210, the DPF-filter 220, the SCR-catalyst 230 and/or the ASC-catalyst 240, and all additional components that may be comprised in the exhaust treatment system, is contingent on temperature. For example, the SCR-catalyst operates most efficiently within a temperature interval of 300-450° C., and acceptably above the whole temperature interval 250-450° C. At a low temperature of the SCR-catalyst, the reduction of nitrogen oxides $NO_x$ is typically inefficient. Additionally, one or several of the other components in the exhaust treatment system 160 may have temperature intervals, within which they are used most efficiently. Therefore, it is important to be able to control the operating temperature for such components in the exhaust treatment system 160.

In this document, a temperature $T_{exhaust}$ for an exhaust treatment system 160 means a temperature in/at/for the exhaust stream through the exhaust treatment system 160. The components in the exhaust treatment system 160 will assume this temperature because of their heat exchange ability. For example, the substrate in the catalysts will assume the temperature of the exhaust stream because of their heat exchange ability.

Figure 3:
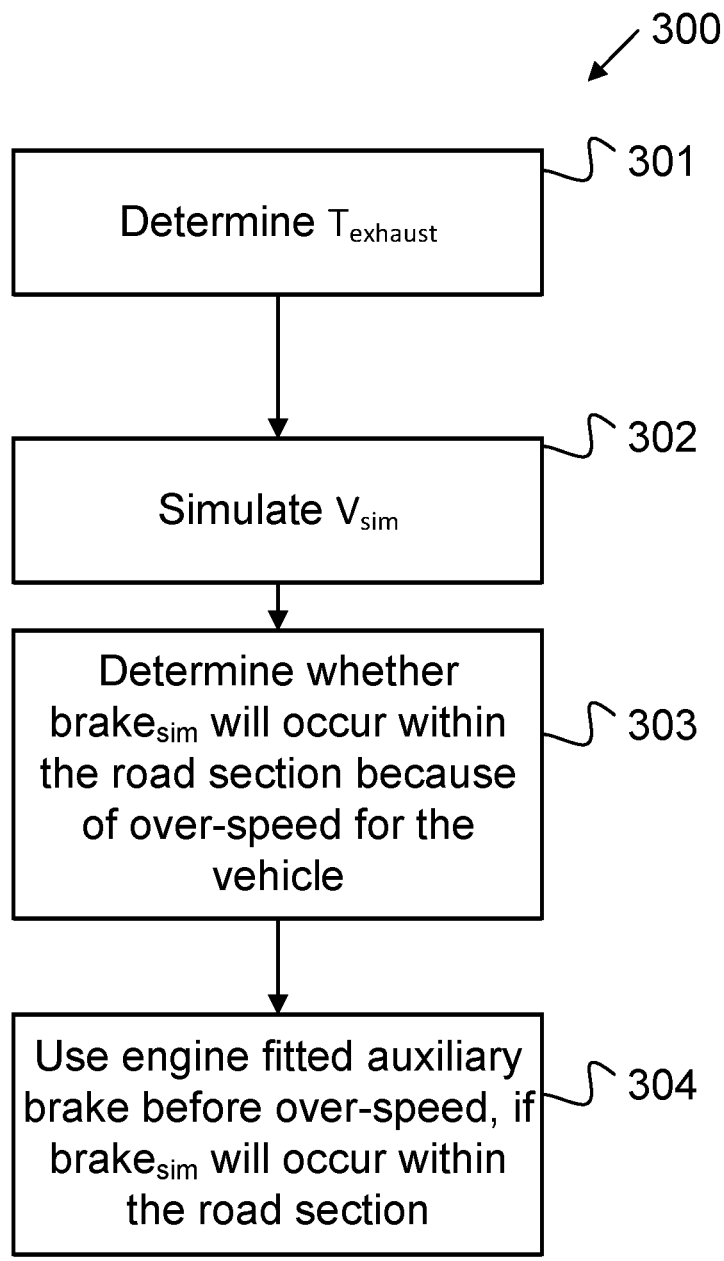
FIG. 3 shows a flow chart.

FIG. 3 shows a flow chart for a method 300 according to the present invention. The method 300 achieves a control of at least one temperature $T_{exhaust}$ for an exhaust treatment system 160 in a vehicle by carrying out the method steps described below.

In a first step 301 of the method, at least one temperature $T_{exhaust}$ is determined for the exhaust treatment system. As described in detail below, this temperature $T_{exhaust}$ may for example be determined by way of measurement or simulation.

In a second step 302 of the method, at least one future velocity profile $v_{sim}$ is simulated for an actual vehicle speed $v_{act}$ within a road section ahead of the vehicle 100. The simulation of the at least one future velocity profile $v_{sim}$ is here based on information relating to the road section ahead of the vehicle. The information about the road section may comprise substantially any information relevant to driving the vehicle, for example concerning road gradient, curvature, junctions, road signs or bus stops.

According to one embodiment of the present invention, the simulated velocity $v_{sim}$ is thus determined based on knowledge about the road section. Such knowledge may be based on one or several of positioning information, such as GPS (Global Positioning System) information, map information, topographical information, weather reports, information communicated between different vehicles and information communicated via radio, and may consist of knowledge about prevailing topography, curvatures, traffic situation, road works, traffic intensity and road conditions. Furthermore, the knowledge may consist of a speed limit for the road section ahead, and a traffic sign in connection with the road. Today, many vehicles comprise systems, such as navigation systems and cruise control systems, which use such information. Therefore, such embodiment may be implemented with minor added complexity in vehicles where the information is already available.

In a third step 303, it is determined whether a simulated active brake process $brake_{sim}$, caused by an over-speed of the vehicle 100, will occur within the road section ahead of the vehicle. Over-speed may for example be defined as a speed exceeding a maximum permitted speed, as described below. The at least one future velocity profile $v_{sim}$, determined in the second method step 302, is here used as a basis for determining whether or not the simulated active brake process $brake_{sim}$ will occur, which means that a potential use of the simulated active brake process $brake_{sim}$ may be determined with high reliability.

If the at least one temperature $T_{exhaust}$ for the exhaust treatment system is lower than a minimum temperature threshold value $T_{min}$, and if the simulated active brake process $brake_{sim}$ is simulated to occur within the road section, at least one engine fitted auxiliary brake 156 is used in a fourth step 304 of the method. The use of the at least one engine fitted auxiliary brake 156 is here initiated before the vehicle 100 reaches a position where over-speed occurs, for example before the vehicle's speed exceeds a defined maximum allowed speed. The at least one engine fitted auxiliary brake 156 is fitted in connection with an exhaust stream from the engine 101 in the vehicle, and may therefore impact the temperature of the exhaust stream, since a use of the at least one engine fitted auxiliary brake through heating of the exhaust treatment system 160 increases the at least one temperature $T_{exh}$. The at least one engine fitted auxiliary brake 156 may for example create heat in the exhaust stream by partly throttling the exhaust flow. This heat created increases the temperature of the exhaust stream, which in turn increases the at least one temperature $T_{exhaust}$.

The minimum temperature threshold value $T_{min}$ may for example have a value related to the temperature at which it was considered, in prior art solutions, that heating of fuel consuming exhaust treatment systems was required, which value may be dependent on the heat sensitivity of the exhaust treatment system's components and may be within the interval of approximately 150-300° C. and preferably within the interval of approximately 250-300° C.

The present invention bases the control of the at least one engine fitted auxiliary brake 156, and accordingly the control of the temperature $T_{exhaust}$ for the exhaust treatment system, on the at least one future velocity profile $v_{sim}$. This means that the method may very reliably and accurately control the engine fitted auxiliary brake 156, since a reliable and accurate prediction about whether over-speed will occur within the road section may be made, as such prediction may be based on the at least one future velocity profile $v_{sim}$.

Accordingly, the method may determine in advance whether over-speed will occur, which means that the method may also determine in advance whether an active brake process will occur within the road section. If an active brake process will occur within the road section ahead of the vehicle, that is to say if the vehicle will actively brake relatively soon, the at least one engine fitted auxiliary brake 156 will be activated before the active brake process occurs. The use of the at least one engine fitted auxiliary brake 156 then heats the exhaust stream which, in turn, heats the components in the exhaust treatment system 160. By activating the at least one engine fitted auxiliary brake 156 already before the active brake process occurs, a longer period of time with the use of the at least one engine fitted auxiliary brake 156, and accordingly an improved heating of the exhaust treatment system's components, is obtained. Accordingly, a more efficient purification of the exhaust stream from the engine, passing through the exhaust treatment system 160, is achieved.

If thus the point in time/position, at which the at least one engine fitted auxiliary brake 156 is activated, is selected according to the invention, such activation-point in time/position is brought forward in time compared to prior art systems, which means that braking may go on for a longer period of time. This leads to a reduction of the average power for the braking, since the energy to be braked away is distributed over a longer time period. Accordingly, the braking occurs with a lower average power, so that a greater part of the braking energy may be used to heat the components in the exhaust treatment system, compared to prior art systems. Accordingly, the control of the at least one engine fitted auxiliary brake 156 becomes adapted to the exhaust treatment system's potential for recycling braking energy through heating of its components.

By using a lower braking effect, that is to say by braking over a longer period of time according to the invention, a greater part of the braking may be carried out with the at least one engine fitted auxiliary brake 156, compared to prior art braking with higher braking effect. This is advantageous, since no energy may be recycled at braking with traditional braking systems.

Overall, with the use of the invention lower emissions are obtained from the vehicle, since the components in the exhaust treatment system may operate at suitable temperatures, which means that the efficiency of the exhaust treatment system's components increases.

Additionally, a reduced average speed, resulting from an extension of the braking period according to the invention, also has the effect that the air resistance against the vehicle decreases. This means that less energy is braked away by air resistance, which in turn means that more energy may be braked away by the at least one engine fitted auxiliary brake. Accordingly, a part of the energy which was previously braked away by air resistance may be recycled with the present invention, in the form heating of the exhaust treatment system's components.

According to one embodiment, the use of the at least one engine fitted auxiliary brake is limited to be carried out only if such use means that the exhaust stream passing through the exhaust treatment system obtains, by way of braking with the at least one engine fitted auxiliary brake, a favorable exhaust flow and/or a favorable exhaust stream temperature $T_{exhaust\_stream}$ to be able to achieve the desired at least one temperature $T_{exhaust}$. In other words, according to one embodiment braking with the at least one engine fitted auxiliary brake is carried out only if the braking may provide the desired heating of at least one component in the exhaust treatment system. Thus, inconsistent control of braking in the vehicle is avoided.

Additionally, it is important that the total braking energy resulting from the braking with the at least one engine fitted auxiliary brake and the actual active brake process $brake_{act}$ does not exceed a braking energy in the vehicle, requested by for example a driver, a cruise control or a constant speed brake. The control of the at least one temperature $T_{exhaust}$ is therefore carried out only in such a way that a total braking energy provided, comprising extra braking energy obtained by way of control of the at least one temperature $T_{exhaust}$ according to the invention, is lower than a simulated requested total braking energy for a present driving situation. The extra braking energy is achieved here, as described above, through the use of the at least one engine fitted auxiliary brake 156 during a time period $T_{brake\_invention}$, which corresponds to the distance $brake_{invention}$, and with an effect $P_{brake}$.

The control of the at least one temperature $T_{exhaust}$ for the exhaust treatment system may, according to one embodiment, result in an increase of the at least one temperature $T_{exhaust}$ through the use of the at least one engine fitted auxiliary brake 156. Thus, a temperature increase of the at least one temperature $T_{exhaust}$ for the exhaust treatment system and/or its components is achieved. Such temperature increase is achieved here, if the minimum temperature threshold value $T_{min}$ corresponds to a first minimum temperature value $T_{min\_same\_gear}$; $T_{min}=T_{min\_same\_gear}$; where the first minimum temperature threshold value $T_{min\_same\_gear}$ has a value determined with respect to the fact that no shifting of gears occurs in a gearbox 103 in the vehicle, that is to say that the vehicle continues to be driven with the use of the same gear, which was used before the use of the at least one engine fitted auxiliary brake 156 was started. If, thus, the at least one temperature $T_{exhaust}$ for the exhaust treatment system is lower than the first minimum temperature threshold value $T_{min\_same\_gear}$, and if the simulated active brake process $brake_{sim}$ is simulated within the road section, the at least one engine fitted auxiliary brake 156 will here be activated, which will result in an increase of the at least one temperature $T_{exhaust}$. This increase may here constitute an actual increase by for example 50° C., which results in the at least one temperature $T_{exhausts}$ exceeding 250° C., and, for one embodiment, exceeding 300° C. The first minimum temperature threshold value $T_{min\_same\_gear}$ may thus be within the interval 200-250° C. for various embodiments.

It should be noted that increases/decreases of the at least one temperature $T_{exhaust}$, which in this document are described to result from the invention, constitute relative increases/decreases, that is to say increases/decreases compared to if the control of the at least one temperature $T_{exhaust}$ according to the invention would be deactivated. In other words, these relative increases/decreases may result in greater increases/decreases than increases/decreases produced by prior art methods. This also means, for example, that a relative increase, according to the invention described in this document, of the at least one temperature $T_{exhaust}$ may constitute an actual reduction of the at least one temperature $T_{exhaust}$ but that the at least one temperature $T_{exhaust}$ at such actual reduction is reduced less than it would have been with the invention deactivated and/or through the use of prior art solutions. Similarly, this means, for example, that a relative reduction of the at least one temperature $T_{exhaust}$, which occurs with the use of the invention, may constitute an actual increase of the at least one temperature $T_{exhaust}$ but that the at least one temperature $T_{exhaust}$ at such factual increase increases less than it would have done if the invention were deactivated and/or with the use of prior art solutions.

According to one embodiment of the present invention, shifting gears, that is to say gear changes, in the gearbox 103 may be used in combination with the use of the at least one engine fitted auxiliary brake 156, to control the at least one temperature $T_{exhaust}$. The gear used impacts the flow through the engine, and accordingly the flow in the exhaust stream. This means that mass flow in the exhaust stream may be controlled by controlling the shifts of the gearbox. For example, a down-shift results in an increased mass flow, and a faster heating of the exhaust treatment system, if the exhaust stream is warmer than the exhaust treatment system $T_{exhaust}$. Similarly, an up-shift results in a reduced mass flow and a slower heating, if the exhaust stream is warmer than the exhaust treatment system $T_{exhaust}$.

Thus, according to one embodiment both temperature and mass flow for the exhaust stream may be controlled by using a suitable combination of gear in the gearbox 103 and braking with the at least one engine fitted auxiliary brake 156. Thus, a very accurate and flexible control of the at least one temperature $T_{exhaust}$ may be achieved.

Control of the at least one temperature $T_{exhaust}$ may be arranged to achieve a moderate increase of the at least one temperature $T_{exhaust}$, with the use of the at least one engine fitted auxiliary brake 156 while an up-shift is carried out in the gearbox 103. The combination of the up-shift and the use of the at least one engine fitted auxiliary brake is used here, if the at least one temperature $T_{exhaust}$ for the exhaust treatment system is below a second minimum temperature threshold value $T_{min\_up\_gear}$, that is to say that the minimum temperature threshold value $T_{min}$ corresponds to the second minimum temperature threshold value $T_{min\_up\_gear}$; $T_{min}=T_{min\_up\_gear}$, and if the vehicle will reach an over-speed within the road section. Thus, the moderate increase of the at least one temperature $T_{exhaust}$ is achieved. The moderate increase may here constitute an actual increase by approximately 30° C., which results in the at least one temperature $T_{exhaust}$ exceeding 250° C., and for one embodiment also exceeding 300° C. The second minimum temperature threshold value $t_{min\_up\_gear}$ may thus for example be within an interval of approximately 220-270° C. for different embodiments.

The control of the at least one temperature $T_{exhaust}$ may also be arranged to achieve a considerable increase of the at least one temperature $T_{exhaust}$, by using the at least one engine fitted auxiliary brake at the same time as a down-shift is carried out in the gearbox 103. The combination of the down-shift and the use of the at least one engine fitted auxiliary brake is used here, if the at least one temperature $T_{exhaust}$ for the exhaust treatment system is below a third minimum temperature threshold value $T_{min\_down\_gear}$; that is to say that the minimum temperature threshold value $T_{min}$ corresponds to the third minimum temperature threshold value $T_{min}=T_{min\_down\_gear}$, and if the vehicle will reach over-speed within the road section. Thus, a considerable increase of the at least one temperature $T_{exhaust}$ is achieved. The considerable increase may here constitute an actual increase by approximately 100° C., which results in the at least one temperature $T_{exhaust}$ exceeding 250° C., and for one embodiment, also exceeding 300° C. The third minimum temperature threshold value $T_{min\_down\_gear}$ may thus for example be within the interval 150-200° C. for different embodiments.

Thus, in this document, the first minimum temperature threshold value $T_{min\_same\_gear}$ may have a value related to the desirable operating temperature interval, and to the assumed potential actual size of the temperature increase, so that the first minimum temperature threshold value $T_{min\_same\_gear}$ may for example be within the interval of approximately 200-250° C. The second minimum temperature threshold value $T_{min\_up\_gear}$ may have a value which is related to the desirable operating temperature interval, and to the assumed potential actual size of the temperature increase, so that the second minimum temperature threshold value $T_{min\_up\_gear}$ may for example be within the interval of approximately 220-270° C. The third minimum temperature threshold value $T_{min\_down\_gear}$ may have a value related to the desirable operating temperature interval, and to the assumed potential actual size of the temperature increase, so that the third minimum temperature threshold value $T_{min\_down\_gear}$ may for example be within the interval of approximately 150-200° C.

As described above, gear shifts, that is to say gear changes in the gearbox 103, may be used to control the at least one temperature $T_{exhaust}$. The gear used impacts the flow through the engine, and accordingly the flow in the exhaust stream, so that the mass flow in the exhaust stream may be controlled by controlling gear shifts in the gearbox. For example, a down-shift results in an increased mass flow, and a faster heating of the exhaust treatment system, if the exhaust stream is warmer than the exhaust treatment system $T_{exhaust}$. Similarly, an up-shift results in a reduced mass flow and a slower heating, if the exhaust stream is warmer than the exhaust treatment system $T_{exhaust}$. It should be noted that if, for example, the exhausts are colder than the temperature $T_{exhaust}$ for the exhaust treatment system, a continued use of a previously used gear will provide a cooling of the exhaust treatment system and its components, even without an earlier use of the at least one engine fitted auxiliary brake according to the present invention. If, additionally, a down-shift is carried out, the cooling becomes stronger.

According to one embodiment the determination 303 as to whether the simulated active brake process $brake_{sim}$ will occur within the road section comprises a determination as to whether the simulated active brake process $brake_{sim}$ is preceded by a simulated rolling $roll_{sim}$, where such simulated rolling $roll_{sim}$ may correspond to some type of dragging of the vehicle.

Vehicles today often have a cruise control installed. Such cruise control devices may be equipped with functions for rolling/dragging, so that the vehicle is dragged if a simulation of the at least one future velocity profile $v_{sim}$ shows that no fuel needs to be injected in the engine's cylinders for the vehicle to be able to maintain a desired actual vehicle speed $v_{act}$. Rolling/dragging of the vehicle may also be used to brake the vehicle by so-called engine braking, where the engine's resistance against being dragged around without supply of fuel is used to brake the vehicle. Rolling may also be achieved by an experienced driver of the vehicle who, at suitable points in time/positions cuts the fuel supply to the engine by releasing the accelerator pedal (or manoeuvring another throttle) and possibly also selecting a gear in the gearbox.

The simulated rolling $roll_{sim}$ may here thus consist of a propulsion of the vehicle 100 in a previously used gear in the gearbox 103, with a closed power-train and closed fuel injection to the combustion engine 101, wherein the vehicle is moved forward by kinetic energy in the vehicle. In other words, the simulated rolling $roll_{sim}$ may consist of a dragging of the vehicle in the same gear.

The simulated rolling $roll_{sim}$ may also consist of a propulsion of the vehicle 100, following an up-shift in the gearbox 103 with a closed power-train and closed fuel injection to the combustion engine 101, so that the vehicle is moved forward by its kinetic energy. Accordingly, the simulated rolling $roll_{sim}$ may consist of a dragging of the vehicle in a higher gear.

The simulated rolling $roll_{sim}$ may also consist of a propulsion of the vehicle 100, following a down-shift in the gearbox 103 with a closed power-train and closed fuel injection to the combustion engine 101. The vehicle is here moved forward by its kinetic energy. Thus, the simulated rolling $roll_{sim}$ may consist of a dragging of the vehicle in a lower gear.

According to one embodiment of the present invention, the use of the at least one engine fitted auxiliary brake 156 is initiated substantially when the actual rolling $roll_{act}$ is started. The actual rolling $roll_{act}$ corresponds, in this document, to the simulated rolling $roll_{sim}$, and constitutes the actual rolling that is a result of the simulated rolling $roll_{sim}$. In other words, the simulated rolling $roll_{sim}$ for the simulated velocity profile $v_{sim}$ corresponds to the actual rolling $roll_{act}$ for the actual vehicle speed $v_{act}$, corresponding to the simulated velocity profile $v_{sim}$. The simulated velocity profile $v_{sim}$ represents, in this document, a simulation of the corresponding actual vehicle speed $v_{act}$ within the road section, where a cruise control 120 is assumed to be used to control of the actual vehicle speed $v_{act}$. The simulation of the simulated velocity profile $v_{sim}$ is carried out when said road section is ahead of said vehicle 100.

Initiation/activation of the use of the at least one engine fitted auxiliary brake 156 substantially when the actual rolling $roll_{act}$ is initiated, ensures that the at least one engine fitted auxiliary brake is used for a long time, which entails that the average effect of the braking drops and that a greater part of the braking energy may be used to heat the components in the exhaust treatment system, as mentioned above.

Figure 4:
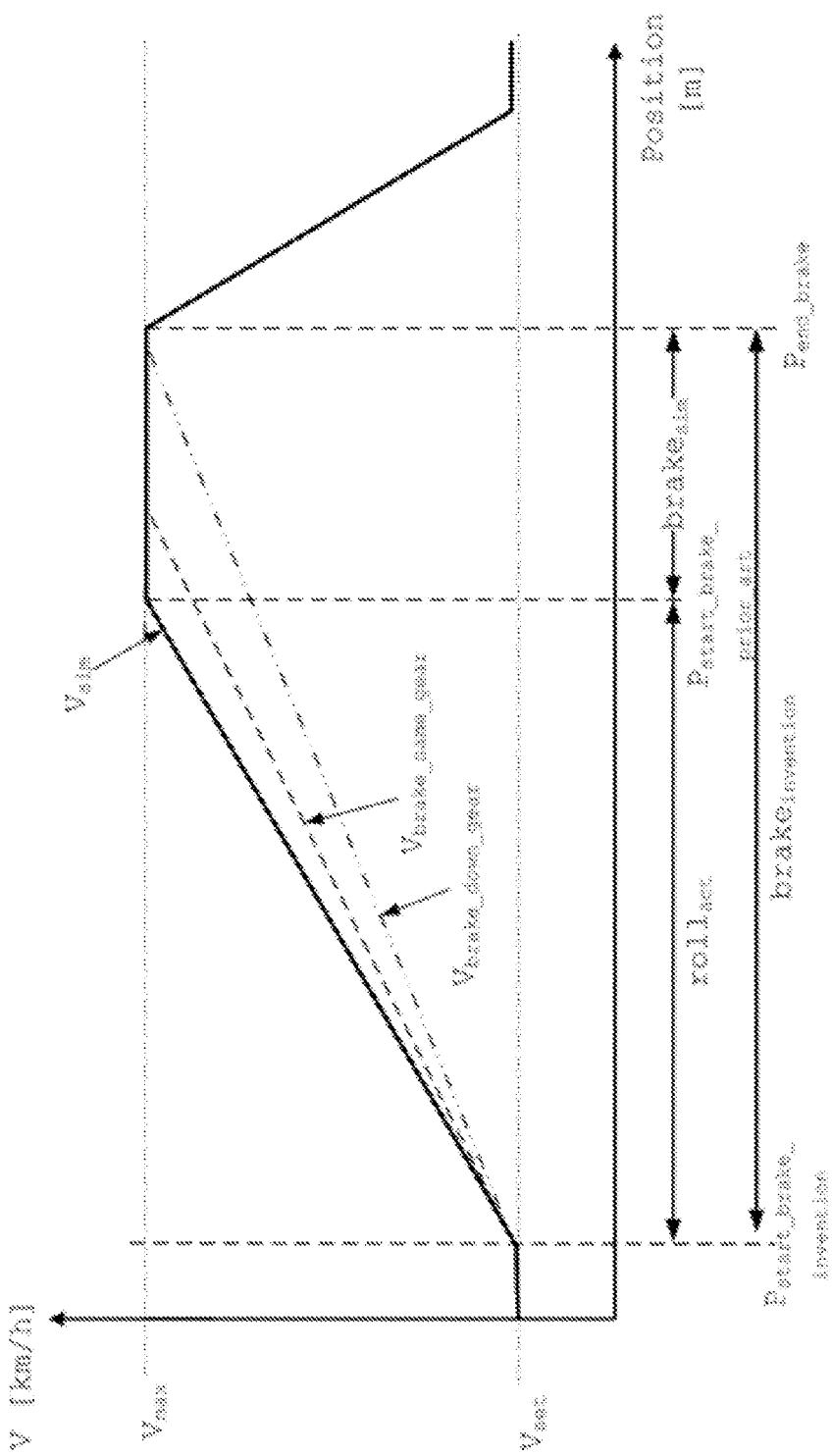
FIG. 4 shows an example of a driving mode where the present invention is used, and
FIG. 5 schematically shows a control device.

FIG. 4 schematically shows the result of using a couple of embodiments of the present invention, compared to prior art technology for a driving mode, for example a downhill slope, for the vehicle. The set-speed $v_{set}$ specifies a speed selected by a driver for a cruise control, corresponding to an actual speed that the vehicle should maintain on a level surface.

The maximum allowed speed $v_{max}$ may in this document be related to a constant speed brake speed $v_{dhsc}$ for the vehicle, a distance to at least one vehicle ahead; a road gradient for the road section, a curvature for the road section, a speed limit for the road section and/or a limitation of accessibility for the road section.

The thick solid curve in FIG. 4 shows an example of the future velocity profile $v_{sim}$ for an actual vehicle speed $v_{act}$ within a road section ahead of the vehicle, where no measure is carried out according to the present invention. That is to say, that the velocity profile $v_{sim}$ corresponds to an actual speed $v_{act}$ that would result if prior art solutions were used. As illustrated in the Figure, a simulated active brake process $brake_{sim}$ will occur because of an over-speed for the vehicle, that is to say at the position $P_{start\_brake\_prior\_art}$, where the simulated velocity profile $v_{sim}$ exceeds the maximum allowed speed $v_{max}$. The active brake process $brake_{sim}$ continues to the position $P_{end\_brake}$, where the vehicle's speed, without continued braking, again becomes lower than the maximum allowed speed $v_{max}$.

According to the present invention, a use of the at least one engine fitted auxiliary brake 156 will be used for a longer time than the simulated active brake process brake$_{sim}$ continues.

If the at least one temperature T$_{exhaust}$ for the exhaust treatment system is lower than the minimum temperature threshold value T$_{min}$, and if the simulated active brake process brake$_{sim}$ occurs within the road section, both the conditions according to the present invention are met for initiating the use of the at least one engine fitted auxiliary brake 156 before the vehicle reaches the position where over-speed occurs, that is to say before the vehicle reaches the position P$_{start\_brake\_prior\_art}$, where the simulated velocity profile v$_{sim}$ exceeds the maximum allowed speed v$_{max}$.

According to one embodiment of the invention described above, the at least one engine fitted auxiliary brake 156 is activated substantially at the position P$_{start\_brake\_invention}$, where the above described actual rolling roll$_{act}$ is initiated. This embodiment is illustrated for two different cases in FIG. 4.

The dashed curve v$_{brake\_same\_gear}$ illustrates the use of the at least one engine fitted auxiliary brake, where the vehicle continues to be driven with the use of the same gear that was used, before the use of the at least one engine fitted auxiliary brake. As described above, if the at least one temperature T$_{exhaust}$ for the exhaust treatment system is lower than the first minimum temperature threshold value T$_{min\_same\_gear}$, and if the simulated active brake process brake$_{sim}$ is simulated to occur within the road section, the at least one engine fitted auxiliary brake 156 may be activated without changing gears, providing a moderate braking of the vehicle and also a moderate increase of the at least one temperature T$_{exhaust}$. The use of the at least one engine fitted auxiliary brake is here initiated substantially at the position P$_{start\_brake\_invention}$ where the actual rolling roll$_{act}$ is initiated, which considerably extends the braking period brake$_{invention}$ for the invention, compared to the braking period brake$_{sim}$ for prior art technology.

The dotted curved v$_{brake\_down\_gear}$ in the Figure illustrates the above mentioned combination of a down-shift and the use of the at least one engine fitted auxiliary brake, which may be used if the at least one temperature T$_{exhaust}$ for the exhaust treatment system is lower than a third minimum temperature threshold value T$_{min\_down\_gear}$, and if the vehicle will reach over-speed within the road section. Thus, a powerful braking of the vehicle is achieved, as well as a powerful increase of the at least one temperature T$_{exhaust}$. As illustrated in the Figure, the dotted curve v$_{brake\_down\_gear}$ reaches the maximum allowed speed v$_{max}$ just before the vehicle has reverted to a speed below the maximum allowed speed v$_{max}$. In other words, the dotted curve v$_{brake\_down\_gear}$ provides, in this schematic example, a maximum possible free increase of the at least one temperature T$_{exhaust}$ for the duration of a maximum braking period brake$_{invention}$. In other words, energy which is free and would otherwise have been braked away is here used as far as possible to heat the exhaust treatment system and its components.

According to one embodiment of the present invention, the simulated rolling roll$_{sim}$ is simulated to be applicable if the simulated velocity profile v$_{sim}$ has a higher value than a reference speed v$_{ref}$ for a cruise control device used in the vehicle. The reference speed is the output signal, which the cruise control device provides to the speed governor based on the set-speed selected by the driver v$_{set}$. For traditional cruise control devices the reference speed v$_{ref}$ is equal to the set-speed v$_{set}$.

For cruise control devices with variable reference speeds, also called economical cruise control, the reference speed v$_{ref}$ may be controlled based, for example, on information about the road section ahead of the vehicle, so that the reference speed v$_{ref}$ may differ from the set-speed v$_{set}$ in size. The reference speed v$_{ref}$ may here be determined based on the selected set-speed v$_{set}$, and on one or several of a road gradient for the road section, a distance to at least one vehicle ahead, a curvature for the road section and a speed limit for the road section. FIG. 4 shows a non-limiting example, wherein the reference speed v$_{ref}$, temporarily or constantly, is selected to be equal to the set-speed v$_{set}$.

The simulated vehicle speed v$_{sim}$, illustrated in FIG. 4, and the simulated active brake process brake$_{sim}$ represent simulations of corresponding actual vehicle speeds v$_{act}$ and actual brake processes brake$_{act}$, respectively. In the Figure, the actual vehicle speed v$_{act}$ coincides with the simulated vehicle speed v$_{sim}$, which is often the case, since the simulated vehicle speed v$_{sim}$ may often be determined with good accuracy according to the present invention. The actual active brake process brake$_{act}$ ends at the position P$_{end\_brake}$, where the actual vehicle speed v$_{act}$, after the actual active brake process brake$_{act}$ has been initiated, has reverted to a value lower than the maximum allowed speed v$_{max}$. The actual active brake process brake$_{act}$, corresponding to said simulated active brake process brake$_{sim}$, starts/is initiated at the position P$_{start\_brake\_prior\_art}$ m where the actual vehicle speed v$_{act}$ reaches a value which is greater than or equal to the maximum allowed speed v$_{max}$.

Similarly, the actual active brake process, corresponding to the braking period brake$_{invention}$, starts/is initiated according to the invention at the position P$_{start\_brake\_invention}$, for example where the rolling roll$_{act}$ is started.

The actual active brake process brake$_{act}$, which corresponds to the simulated active brake process brake$_{sim}$, may occur and be identified in connection with for example a downhill slope in the road section. The actual active brake process brake$_{act}$ may also occur at other decelerations, such as before junctions, speed limits and traffic jams, or to avoid driving into a vehicle ahead. The actual active brake process brake$_{act}$ comprises that a driver and/or a control system, such as a cruise control system and/or a constant speed brake, actively uses a wheel brake 151, 152, 153, 154 and/or an auxiliary brake 155, 156. The auxiliary brakes may here comprise one or several of a retarder, said engine fitted auxiliary brake 156 and an electromagnetic brake.

According to one embodiment of the present invention, simulations of at least two approaches are carried out, each of which comprises the use of a respective gear selection with the simultaneous use of the at least one engine fitted auxiliary brake. FIG. 4 shows a non-limiting example of two such simulations, v$_{brake\_same\_gear}$, illustrating braking with the gear selection keeping the current gear, and v$_{brake\_down\_gear}$, illustrating braking with the gear selection down-shift. Naturally, more simulations could be carried out for additional approaches in the example in FIG. 4.

These at least two simulations for the at least two respective approaches are then evaluated. At this evaluation, simulations for approaches for which an actual vehicle speed vast does not reach the maximum allowed speed v$_{max}$ are separated, since they are deemed to be non-applicable because of insufficient free energy that may be used to heat the exhaust treatment system in this driving mode. In other words, only simulations for approaches for which an actual vehicle speed v$_{act}$ reaches a value greater than or equal to the maximum allowed speed $v_{max}$ are deemed applicable. One of these applicable approaches is then selected for use in the vehicle.

The method for control of the at least one temperature $T_{exhaust}$ for the exhaust treatment system is based, as described above, among others on a determined value for the at least one temperature $T_{exhaust}$.

According to one embodiment, the value for the at least one temperature $T_{exhaust}$ is determined based on at least one measurement of a temperature $T_{exhaust\_measure}$ for the exhaust treatment system. According to another embodiment, the value for the at least one temperature $T_{exhaust}$ is determined based on at least one simulation of the temperature $T_{exhaust\_sim}$ for the exhaust treatment system 160.

The at least one simulation of the temperature $T_{exhaust\_sim}$ for the exhaust treatment system 160 may, according to one embodiment, be carried out based on the above described at least one future velocity profile $v_{sim}$. The simulation may also be based on an expected exhaust brake effect and/or on an expected engine speed.

The at least one simulation of the temperature $T_{exhaust\_sim}$ for the exhaust treatment system 160 may also, according to another embodiment, be carried out by way of the simulation model, providing the above described at least one future velocity profile $v_{sim}$, being extended so that it also, in addition to the at least one future velocity profile $v_{sim}$, provides the at least one simulation of the temperature $T_{exhaust\_sim}$.

More specifically, at least two simulations of the temperature $T_{exhaust\_sim}$ for the exhaust treatment system 160 may be carried out, one simulation for each of at least two approaches. As mentioned above, each one of the approaches may comprise the use of a respective gear, at the same time as the use of the at least one engine fitted auxiliary brake 156. The at least one simulation of the temperature $T_{exhaust\_sim}$ for the exhaust treatment system is here carried out based on the at least one future velocity profile $v_{sim}$, or by way of an extension of the simulation model providing the at least one future velocity profile $v_{sim}$, as specified above.

After the at least two simulations of the temperature $T_{exhaust\_sim}$ for the exhaust treatment system 160 have been carried out, they are assessed. At the assessment, simulations of approaches are deemed applicable only if they result in a simulated temperature $T_{exhaust\_sim}$, which is favorable at an end $P_{end\_brake}$ for the simulated active brake process $brake_{sim}$, at the same time as a driving time for the vehicle is substantially maintained. A favorable value for the simulated temperature $T_{exhaust\_sim}$ is a value that provides at least one of the components in the exhaust treatment system with a suitable operating temperature, with respect to an efficiency relating to the exhaust purification in the exhaust treatment system. For example, an SCR-catalyst may be supplied with heat, so that it may be operated in the favorable temperature interval 250-450° C., and preferably within 300-450° C.

A person skilled in the art will realize that a method for control of a temperature $T_{exhaust}$ for an exhaust treatment system according to the present invention, may also be implemented in a computer program, which when executed in a computer will cause the computer to carry out the method. The computer program usually forms a part of a computer program product 503, where the computer program product comprises a suitable non-volatile/permanent/durable/permanent digital storage medium on which the computer program is stored. Said non-volatile/permanent/durable/permanent computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk unit, etc.

Figure 5:
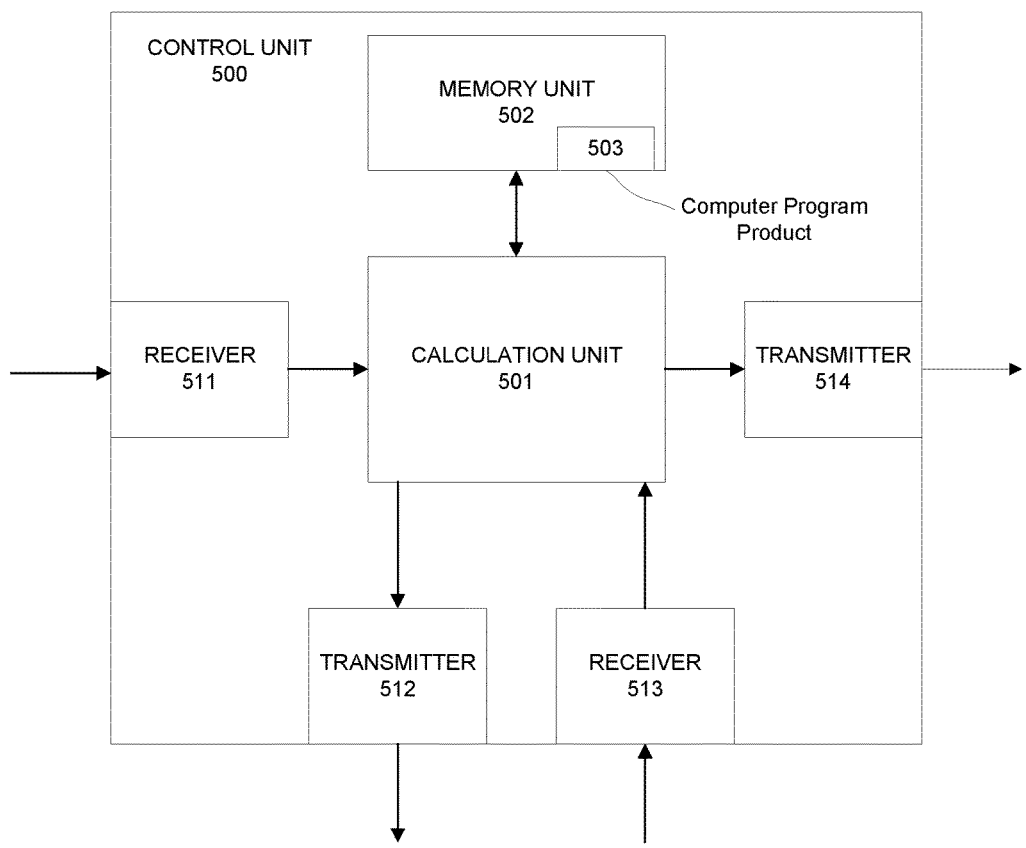

FIG. 5 schematically shows a control device 500. The control device 500 comprises a calculation unit 501, which may consist of essentially a suitable type of processor or microcomputer, e.g. a circuit for digital signal processing (Digital Signal Processor, DSP), or a circuit with a predetermined specific function (Application Specific Integrated Circuit, ASIC). The calculation unit 501 is connected to a memory unit 502 installed in the control device 500, providing the calculation device 501 with e.g. the stored program code and/or the stored data, which the calculation device 501 needs in order to be able to carry out calculations. The calculation unit 501 is also set up to store interim or final results of calculations in the memory unit 502.

Further, the control device 500 is equipped with devices 511, 512, 513, 514 for receiving and sending of input and output signals, respectively. These input and output signals may contain wave shapes, pulses, or other attributes, which may be detected as information by the devices 511, 513 for the receipt of input signals, and may be converted into signals that may be processed by the calculation unit 501. These signals are then provided to the calculation unit 501. The devices 512, 514 for sending output signals are arranged to convert the calculation result from the calculation unit 501 into output signals for transfer to other parts of the vehicle's control system and/or the component(s) for which the signals are intended.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection.

A person skilled in the art will realize that the above-mentioned computer may consist of the calculation unit 501, and that the above-mentioned memory may consist of the memory unit 502.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown thus often comprise significantly more control devices than shown in FIGS. 1 and 5, as is well known to a person skilled in the art within the technology area.

The present invention, in the embodiment displayed, is implemented in the control device 500. The invention may, however, also be implemented wholly or partly in one or several other control devices already existing in the vehicle, or in a control device dedicated to the present invention.

According to one aspect of the present invention, a system is provided, arranged for the control of at least one temperature $T_{exhaust}$ for an exhaust treatment system 160 in a vehicle. The system comprises a first determination unit 131, arranged for the determination 301 of the at least one temperature $T_{exhaust}$ for the exhaust treatment system 160. The system also comprises a simulation unit 132, arranged for simulation 302 of at least one future velocity profile $v_{sim}$ for an actual vehicle speed $v_{act}$ within a road section ahead of the vehicle 100, wherein the simulation is based on information relating to the road section.

The system also comprises a second determination unit 133, arranged for the determination 303, based on the at least one future velocity profile $v_{sim}$, as to whether s simulated active brake process $brake_{sim}$ caused by an over-speed for the vehicle 100 will occur within the road section.

The system also comprises a utilization unit 134, arranged for the use 304, if the at least one temperature $T_{exhaust}$ for the exhaust treatment system is below a minimum temperature threshold value $T_{min}$, and if the simulated active brake process $brake_{sim}$ is simulated to occur within the road section, by at least one engine fitted auxiliary brake 156, which is fitted in connection with an exhaust stream from an engine 101 in the vehicle 100. The use of the at least one engine fitted auxiliary brake 156 is initiated before the vehicle 100 reaches a position where the over-speed occurs.

The utilization unit may in different ways ensure that the use of the at least one engine fitted auxiliary brake 156 is initiated before the vehicle 100 reaches a position when the over-speed occurs. Activation of the at least one engine fitted auxiliary brake 156 before the vehicle 100 reaches the position where over-speed occurs may be achieved, for example, by way of settings in one or several control systems in the vehicle. Such systems may comprise for example control systems which control braking, such as cruise control or constant speed brake systems. The use of the at least one engine fitted auxiliary brake 156 before the vehicle 100 reaches a position where over-speed occurs, may also be achieved by way of instructing the driver of the vehicle to use the at least one engine fitted auxiliary brake 156 before the vehicle 100 reaches a position where over-speed occurs, following which the driver may make an active selection to use or not to use the invention. The instruction to the driver may be provided by way of an indication of some type, such as for example through a lamp, an instrument, a sound, a display or similar. The driver may then via a suitable input device, such as a push-button, a knob, a touch-screen or similar, make his or her active selections.

A driver-activated braking is typically controlled with a brake pedal, a brake lever or another brake control element. However, the above described settings for the braking may impact the result of the driver-activated braking.

The system according to the present invention may be arranged to carry out all of the method embodiments described above and in the claims, wherein the system for the respective embodiment achieves the above described advantages for the respective embodiment.

A person skilled in the art will also realize that the above system may be modified according to the different embodiments of the method according to the invention. In addition, the invention relates to a motor vehicle 100, for example a truck or a bus, comprising at least one system for the control of at least one temperature $T_{exhaust}$ for an exhaust treatment system The present invention is not limited to the embodiments of the invention described above, but relates to and comprises all embodiments within the scope of the enclosed independent claims.

The invention claimed is:

1. A method for control of at least one temperature $T_{exhaust}$ for an exhaust treatment system in a vehicle, said method comprising
   determining at least one temperature $T_{exhaust}$ for said exhaust treatment system;
   simulating at least one future velocity profile $v_{sim}$ for an actual vehicle speed $v_{act}$ within a road section ahead of said vehicle, wherein said simulation is based on information relating to said road section;
   determining, based on said at least one future velocity profile $v_{sim}$, whether a simulated active brake process $brake_{sim}$ because of an over-speed for said vehicle will occur within said road section; and
   using, if said at least one temperature $T_{exhaust}$ for said exhaust treatment system is below a minimum temperature threshold value $T_{min}$, and if said simulated active brake process $brake_{sim}$ is simulated to occur within said road section, at least one engine fitted auxiliary brake, fitted in connection with an exhaust stream from an engine in said vehicle, wherein said use of said at least one engine fitted auxiliary brake is initiated before said vehicle reaches a position where said over-speed occurs.

2. A method according to claim 1, wherein said control of said at least one temperature $T_{exhaust}$ for an exhaust treatment system achieves an increase of said at least one temperature $T_{exhaust}$, by way of use of said at least one engine fitted auxiliary brake, if said minimum temperature threshold value $T_{min}$ corresponds to a first minimum temperature threshold value $T_{min\_same\_gear}$; $T_{min}=T_{min\_same\_gear}$.

3. A method according to claim 2, wherein said increase of said at least one temperature $T_{exhaust}$ is a relative increase, which constitutes an increase compared to if said control of said at least one temperature $T_{exhaust}$ for an exhaust treatment system had been inactivated.

4. A method according to claim 1, wherein said control of said at least one temperature $T_{exhaust}$ for an exhaust treatment system achieves a moderate increase of said at least one temperature $T_{exhaust}$, through said use of said at least one engine fitted auxiliary brake, and by way of an up-shift in a gearbox in said vehicle, if said minimum temperature threshold value $T_{min}$ corresponds to a second minimum temperature threshold value $T_{min\_up\_gear}$; $T_{min}=T_{min\_up\_gear}$.

5. A method according to claim 1, wherein said control of said at least one temperature $T_{exhaust}$ for an exhaust treatment system achieves a considerable increase of said at least one temperature $T_{exhaust}$, through said use of said at least one engine fitted auxiliary brake, and by way of a down-shift in a gearbox in said vehicle, if said minimum temperature threshold value $T_{min}$ corresponds to a third minimum temperature threshold value $T_{min\_down\_gear}$; $T_{min}=T_{min\_down\_gear}$.

6. A method according to claim 1, wherein said determination as to whether said simulated active brake process $brake_{sim}$ will occur within said road section comprises a determination, as to whether said simulated active brake process $brake_{sim}$ is preceded by a simulated rolling $roll_{sim}$.

7. A method according to claim 6, wherein said simulated rolling $roll_{sim}$ comprises one from among the group of:
   a propulsion of said vehicle in a previously used gear in a gearbox in said vehicle through the use of kinetic energy for said vehicle, when a power-train in said vehicle is closed, and when a fuel injection to a combustion engine in said vehicle is closed;
   a propulsion of said vehicle after an up-shift has been carried out in a gearbox in said vehicle through the use of kinetic energy for said vehicle, when a power-train in said vehicle is closed, and when a fuel injection to a combustion engine in said vehicle is closed; and
   a propulsion of said vehicle after a down-shift has been carried out in a gearbox in said vehicle through the use of kinetic energy for said vehicle, when a power-train in said vehicle is closed, and when a fuel injection to a combustion engine in said vehicle is turned off.

8. A method according to claim 6, wherein said use of said at least one engine fitted auxiliary brake is initiated substantially, when an actual rolling $\text{roll}_{act}$, corresponding to said simulated rolling $\text{roll}_{sim}$, is initiated.

9. A method according to claim 6, wherein said simulated rolling $\text{roll}_{sim}$ is simulated to be applied, when said simulated velocity profile $v_{sim}$ has a higher value than a reference speed $v_{ref}$ for a cruise control device used in the vehicle.

10. A method according to claim 9, wherein said reference speed $v_{ref}$ is determined for said road section by said cruise control device, based on a selected set-speed $v_{set}$ and on at least one from among the group:
 a road gradient for said road section,
 a distance to at least one vehicle ahead,
 a curvature for said road section; and
 a speed limit for said road section.

11. A method according to claim 1, wherein an actual brake process $\text{brake}_{act}$, corresponding to said simulated active brake process $\text{brake}_{sim}$, ends when an actual vehicle speed $v_{act}$, after said actual active brake process $\text{brake}_{act}$ has been initiated, again has a lower value than a maximum allowed speed $v_{max}$.

12. A method according to claim 1, wherein an actual brake process $\text{brake}_{act}$, corresponding to said simulated active brake process $\text{brake}_{sim}$, starts when an actual vehicle speed $v_{act}$ reaches a value greater than or equal to a maximum allowed speed $v_{max}$.

13. A method according to claim 12, wherein said maximum allowed speed $v_{max}$ is related to one from among the group of:
 a constant speed brake speed $v_{dhsc}$ for said vehicle;
 a distance to at least one vehicle ahead;
 a road gradient for said road section;
 a curvature for said road section;
 a speed limit for said road section; and
 a limitation of accessibility for said road section.

14. A method according to claim 1, wherein said method comprises:
 simulating at least two approaches being carried out, where each of said approaches comprises the use of a respective gear selection, simultaneously with said use of said at least one engine fitted auxiliary brake; and
 evaluating said at least two simulations, wherein only simulations for approaches, for which an actual vehicle speed $v_{act}$ reaches a value greater than or equal to a maximum allowed speed $v_{max}$, are deemed applicable.

15. A method according to claim 1, wherein an actual active brake process $\text{brake}_{act}$, corresponding to said simulated active brake process $\text{brake}_{sim}$, is identified in connection with a downhill slope in said road section.

16. A method according to claim 1, wherein said use of said at least one engine fitted auxiliary brake increases said at least one temperature $T_{exhaust}$ by way of heating in said exhaust treatment system.

17. A method according to claim 1, wherein an actual active brake process $\text{brake}_{act}$, corresponding to said simulated active brake process $\text{brake}_{sim}$, comprises an active use by a driver, and/or a control system of one or several of:
 a wheel brake; and
 an auxiliary brake.

18. A method according to claim 17, wherein said auxiliary brake comprises one or several from among the group:
 a retarder;
 said engine fitted auxiliary brake; and
 an electromagnetic brake.

19. A method according to claim 18, wherein said engine fitted auxiliary brake comprises one or several of:
 an exhaust brake; and
 a decompression brake.

20. A method according to claim 1, wherein said determination of said at least one temperature $T_{exhaust}$ is carried out based on at least one simulation of a temperature $T_{exhaust\_sim}$ for said exhaust treatment system, wherein said at least one simulation of said temperature $T_{exhaust\_sim}$ for said exhaust treatment system is carried out based on said at least one future velocity profile $v_{sim}$.

21. A method according to claim 1, wherein said method comprises:
 performing at least one simulation of a temperature $T_{exhaust\_sim}$ for said exhaust treatment system for each one of at least two approaches, wherein each one of said approaches comprises use of a respective gear selection, simultaneously with use of said at least one engine fitted auxiliary brake, and wherein said at least one simulation of said temperature $T_{exhaust\_sim}$ for said exhaust treatment system is carried out based on said at least one future velocity profile $v_{sim}$; and
 evaluating said at least two simulations, wherein simulations for approaches are deemed to be applicable only when said simulated temperature $T_{exhaust\_sim}$ is favorable at the end of said simulated active brake process $\text{brake}_{sim}$, while a driving time for said vehicle is substantially unchanged.

22. A method according to claim 1, wherein said determination of said at least one temperature $T_{exhaust}$ is carried out based on at least one measurement of a temperature $T_{exhaust\_measure}$ for said exhaust treatment system.

23. A method according to claim 1, wherein said simulated velocity profile $v_{sim}$ represents a simulation of said corresponding actual vehicle speed $v_{act}$ within said road section, when a cruise control is assumed to be used for control of said actual vehicle speed $v_{act}$, wherein said simulation is carried out when said road section is ahead of said vehicle.

24. A method according to claim 1, wherein said simulated rolling $\text{roll}_{sim}$ for said simulated velocity profile $v_{sim}$ corresponds to an actual rolling $\text{roll}_{act}$ for said actual vehicle speed $v_{act}$, corresponding to said simulated velocity profile $v_{sim}$.

25. A method according to claim 1, wherein said simulated active brake process $\text{brake}_{sim}$ for said simulated velocity profile $v_{sim}$ corresponds to an actual brake process $\text{brake}_{act}$ for said actual vehicle speed $v_{act}$, corresponding to said simulated velocity profile $v_{sim}$.

26. A method according to claim 1, wherein said utilization of said at least one engine fitted auxiliary brake is only carried out, if said utilization entails that said exhaust stream thereby obtains a favorable exhaust stream, for said at least one temperature $T_{exhaust}$, and/or a favorable exhaust stream temperature $T_{exhaust\_stream}$.

27. A method according to claim 1, wherein said control of at least one temperature $T_{exhaust}$ for an exhaust treatment system is only carried out in such a way that a provided total braking energy, comprising extra braking energy obtained by way of said control of at least one temperature $T_{exhaust}$ for an exhaust treatment system, is lower than a simulated requested total braking energy for a present driving situation.

28. A method according to claim 27, wherein said extra braking energy, obtained through use said control of at least one temperature $T_{exhaust}$, is achieved by using said at least one engine fitted auxiliary brake during a time period $T_{brake\_invention}$, and with a power $P_{brake}$.

29. A computer program product for control of at least one temperature $T_{exhaust}$ for an exhaust treatment system in a vehicle wherein the computer program product is stored in a non-transitory computer-readable medium and comprises computer-readable program code portions embodied therein, the computer-readable program code portions configured to cause an electronic processor to:

determine at least one temperature $T_{exhaust}$ for said exhaust treatment system;

simulate at least one future velocity profile $v_{sim}$ for an actual vehicle speed $v_{act}$ within a road section ahead of said vehicle, wherein said simulation is based on information relating to said road section;

determine, based on said at least one future velocity profile $v_{sim}$, whether a simulated active brake process $brake_{sim}$ because of an over-speed for said vehicle will occur within said road section; and use, if said at least one temperature $T_{exhaust}$ for said exhaust treatment system is below a minimum temperature threshold value $T_{min}$, and if said simulated active brake process $brake_{sim}$, is simulated to occur within said road section, at least one engine fitted auxiliary brake, fitted in connection with an exhaust stream from an engine in said vehicle, wherein said use of said at least one engine fitted auxiliary brake is initiated before said vehicle reaches a position where said over-speed occurs.

30. A system for control of at least one temperature $T_{exhaust}$ for an exhaust treatment system in a vehicle, said system comprising:

a first determination unit, arranged for the determination of said at least one temperature $T_{exhaust}$ for said exhaust treatment system;

a simulation unit, arranged for the simulation of at least one future velocity profile $v_{sim}$ for an actual vehicle speed $v_{act}$ within a road section ahead of said vehicle, wherein said simulation is based on information relating to said road section;

a second determination unit, arranged for the determination, based on said at least one future velocity profile $v_{sim}$, of whether a simulated active brake process $brake_{sim}$ will occur within said road section because of an over-speed for said vehicle; and a utilization unit, arranged for the use, if said at least one temperature $T_{exhaust}$ for said exhaust treatment system is below a minimum temperature threshold value $T_{min}$, and if said simulated active brake process $brake_{sim}$ is simulated to occur within said road section, of at least one engine fitted auxiliary brake, fitted in connection with an exhaust stream from an engine in said vehicle, wherein said use of said at least one engine fitted auxiliary brake is initiated before said vehicle reaches a position where said over-speed occurs.

* * * * *